United States Patent
Raphalovitz et al.

(10) Patent No.: US 6,919,779 B2
(45) Date of Patent: Jul. 19, 2005

(54) FOLDED MAGNETOSTRICTIVE WAVE GUIDE

(75) Inventors: Alexander Raphalovitz, Sarasota, FL (US); Arnold F. Sprecher, Jr., Raleigh, NC (US); David S. Nyce, Apex, NC (US)

(73) Assignee: MTS Systems Corporation, Eden Prairie, MN (US)

( * ) Notice: Subject to any disclaimer, the term of this patent is extended or adjusted under 35 U.S.C. 154(b) by 2 days.

(21) Appl. No.: 10/654,409

(22) Filed: Sep. 3, 2003

(65) Prior Publication Data

US 2005/0046513 A1 Mar. 3, 2005

(51) Int. Cl.⁷ .............................. H03H 9/00; G01B 7/14
(52) U.S. Cl. .................. 333/148; 333/201; 324/207.13; 324/207.24; 310/26

(58) Field of Search ................................ 333/148, 201; 324/207.13, 207.24; 310/26

(56) References Cited

U.S. PATENT DOCUMENTS

| | | | | |
|---|---|---|---|---|
| 2,863,121 A | * | 12/1958 | Powell | 332/112 |
| 3,898,555 A | * | 8/1975 | Tellerman | 324/207.13 |
| 4,035,762 A | * | 7/1977 | Chamuel | 367/117 |
| 4,121,155 A | * | 10/1978 | Chamuel | 324/207.13 |
| 5,923,164 A | * | 7/1999 | Ehling et al. | 324/204.13 |
| 6,426,618 B1 | * | 7/2002 | Nyce et al. | 324/207.13 |

\* cited by examiner

Primary Examiner—Barbara Summons
(74) Attorney, Agent, or Firm—David M. Ostfeld

(57) ABSTRACT

A magnetostrictive system is shown wherein there is included a wave guide but no return wire. The wave guide is folded and acts as the completed wire (whether solid or hollow) for conducting current for the current input pulse.

6 Claims, 2 Drawing Sheets

FOLDED MAGNETOSTRICTIVE WAVE GUIDE

BACKGROUND OF THE INVENTION

1. Field of the Invention

The present invention relates to magnet-based sensors and in particular magnet-based magnetostrictive sensors.

2. Description of the Prior Art

Magnetostrictive transducers having elongated wave guides that carry torsional strain waves induced in the wave guide when current pulses are applied along the wave guide through a magnetic field are well known in the art. A typical linear distance measuring device using a movable magnet that interacts with the wave guide when current pulses are provided along the wave guide is shown in U.S. Pat. No. 3,898,555.

Devices of the prior art of the sort shown in U.S. Pat. No. 3,898,555 also have the sensor element in a housing which also houses the electronics to at least generate the pulse and receive the return signal. The amplitude of the return signal detected from the acoustical strain pulse is, as well known in the art, affected by many parameters. These parameters include the position magnet strength, wave guide quality, temperature, wave guide interrogation current, and assembly tolerances. In the prior art, the wave guide is connected to a return wire to complete the electrical circuit necessary for the wave guide to generate the pulse which stimulates the return signal.

Several types of magnetic-based sensors are available for measuring linear or rotary position. Magnetic-based sensors have an advantage in that they provide non-contact sensing; so there are no parts to wear out. Examples of magnetic-based sensors are LVDTs, inductive sleeve sensors, and magnetostrictive sensors.

A difficulty in the prior art was attaching the return wire to the wave guide in a magnetostrictive application. It normally required a lengthy, involved soldering process. Welding and crimping processes are also possible, but the welding process also is complicated and the crimping process has not been developed to the point where it is reliable without inspection. Nevertheless, those in the prior art have exclusively used a return wire.

It is an object of the present invention to utilize magnetostrictive interrogation without a return wire.

SUMMARY OF THE INVENTION

The present invention relates to a magnetostrictive interrogation system wherein there is no return wire but instead a wave guide is folded to complete the circuit in order to permit interrogation pulses. Normally, the prior art would lead away from the wave guide being folded as in the present invention because copper wire has a lower resistance, and hence lower loss of signal than a wave guide. However, for short distance measurements where resistance is not a problem, the folded wave guide may be useful. Short distances are less than a meter. In addition where wave guides can be made of material that is low resistance, longer distances could be used. Also, with a folded wave guide, if one puts the moveable magnet over the two legs of the wave guide (the folded wave guide) and has a pickup coil over both the wave guides, when the moveable magnet comes close to the pickup coil there is a ringing effect. For these low resistance wave guide applications, the use of longer wave guide legs is less of a problem. In any event, longer wave guide legs can be used in applications that are less sensitive or where the coil stops further from the magnet.

The folded wave guide sensor permits novel methods of manufacturing and miniaturizing a magnetostrictive linear displacement transducer. With the elimination of the need for a copper wire, by folding the wave guide back onto itself, the wave guide is used both as the outgoing conductor and the return path for the electrical current pulse. The strain wave resulting from the electrical stimulation is detected by a counter wound pick up coil, such coil being known in the prior art, or other coils. For example, the counter wound coil has a high number of turns and is spaced to sonically resonate the incoming strain wave. Both the outcoming and return path wave guides are situated in the pick up coil.

Folded wave guide transducers are easy to manufacture. With the wave guide folded back on itself, no copper return wire is necessary to attach. The damping material required at the far end (away from the current pulse) is facilitated by the fold or by a small crimping ring, or both. The polarity of the return signal resulting from detection of the strain wave is independent of the interrogation current pulse. The geometry of the counter wound coil in one embodiment in combination with the folded wave guide has the desired effect of causing a return signal that is twice the amplitude of a similar device with only a single wave guide. In the case where ringing might occur, the coil may be shielded to reject the ambient electrical noise. By shielding the coil or the position magnet, the dead zone between the interrogation circuitry and the position magnet can be minimized.

By being able to use a smaller transducer package for magnetostrictive transducers, such transducers may be installed in applications that have previously not been possible due to the large physical size of the prior art.

DESCRIPTION OF THE DRAWINGS

For a further understanding of the nature and objects of the present invention, reference should be had to the following figures in which like parts are given like reference numerals and wherein.

DESCRIPTION OF THE PREFERRED EMBODIMENT AND ALTERNATE EMBODIMENT

The folded wave guide sensor permits novel methods of manufacturing and miniaturizing a magnetostrictive linear displacement transducer. With the elimination of the need for a copper wire, by folding the wave guide back onto itself, the wave guide is used both as the outgoing conductor and the return path for the electrical current pulse. The strain wave resulting from the electrical stimulation is detected by a counter wound pick up coil, such coil being known in the prior art, or other coils. For example, the counter wound coil has a high number of turns and is spaced to sonically resonate the incoming strain wave. Both the outcoming and return path wave guides are situated in the pick up coil. Folded wave guide transducers are easy to manufacture. With the wave guide folded back on itself, no copper return wire is necessary to attach. The damping material required at the far end (away from the current pulse) is facilitated by the fold or by a small crimping ring, or both. The polarity of the return signal resulting from detection of the strain wave is independent of the interrogation of current pulse. The geometry of the counter wound coil in one embodiment in combination with the folded wave guide has the desired effect of causing a return signal that is twice the amplitude of a similar device with only a single wave guide. In the case where ringing might occur, the coil may be shielded to reject the ambient electrical noise. By shielding the coil or the position magnet, the dead zone between the interrogation circuitry and the position magnet can be minimized.

Figure 1:
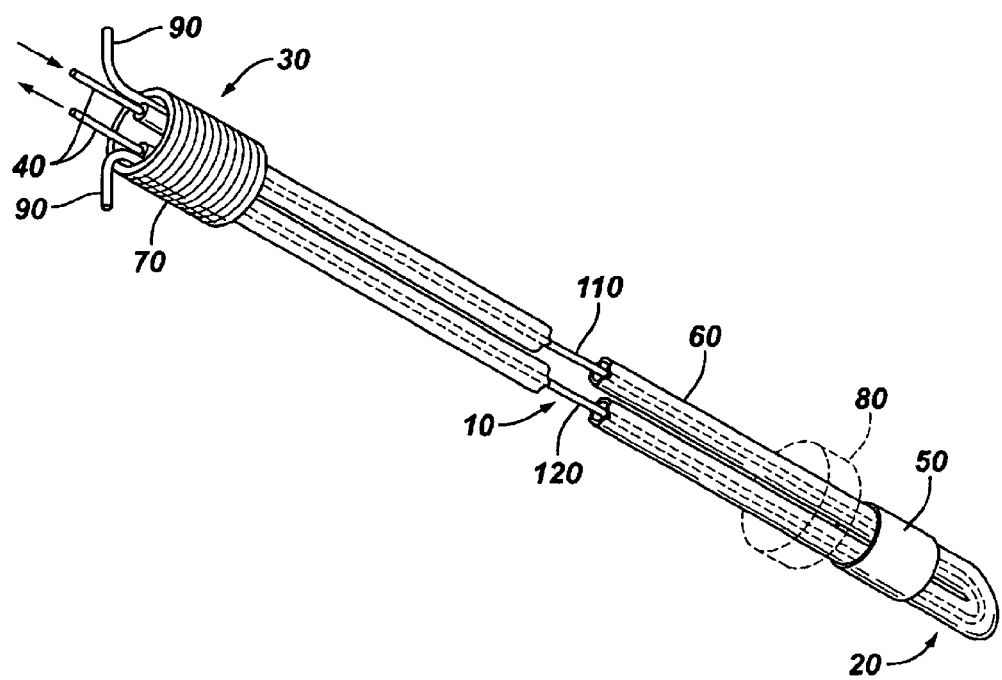
FIG. 1 is a schematic view of linear magnetostrictive position sensor of the present invention showing a wave guide which is folded.

FIG. 1 shows a configuration of a magnetostrictive wave guide folded over. The wave guide is composed of wave guide leads, forming two legs, wave guide legs 110, 120, which extend from a sensor head 30 to an opposing end 20. The wave guide 10 is folded at end 20, forming the wave guide legs 110, 120. A damp, such as a metal band, 50 may be employed to dampen echos when input current pulses are introduced. A position magnet 80 is positioned along folded wave guide 10 legs 110, 120 and interacts with the input pulse as is well known in the art. Sensor head 30 picks up that interaction through pick up coil 70 and is measured at coil leads 90.

As shown in the FIG. 1, a wave guide 10 has material as known in the art. See for example U.S. Pat. No. 3,898,555. However, as shown in FIG. 1, there is no return line separate from the wave guide 10. Instead, wave guide 10 is folded at its end 20 and becomes its own return wire as legs 110, 120. Legs 110, 120 end at the sensor portion or head 30 which is mounted around wave guide leads 40 (wave guide legs 110, 120). The wave guide leads 40 are preferably insulated from each other in order to support a current flowing through them while not accidentally shorting. The leads 40 are also insulated from each other throughout the entire length of the wave guide 10, including at the fold 20, in order to permit the current to flow through them without such shorting. In order for the wave guide 10 to be folded, either the detector starting with sensor lead 30 has to wait until all reflections have died down or alternatively metal band 50 or other material maybe used as a damp at the end 20 to squeeze on a suspension sleeve 60 with an amount of pressure as known in the art in order to dampen a reflection. The wave guide suspension sleeve 60 is also the insulation isolating the two legs 110, 120 of the folded wave guide 10.

As shown in FIG. 1, the pickup coil 70 at sensor portion 30 detects the return signals from the folded wave guide 10, i.e. there are two signals, one down each leg 110, 120 of the folded wave guide 10 returning from the position magnet 80, which increases the strength of the signal by increasing the signal-to-noise ratio approximately by a factor of two, such return signals from the position magnet 80 being detected by the pickup coil 70 and being sensed at coil leads 90. Coil leads 90 may be connected as is well known in the art to process the signals from the two legs of folded wave guide 10, legs 110 and 120.

Figure 2:
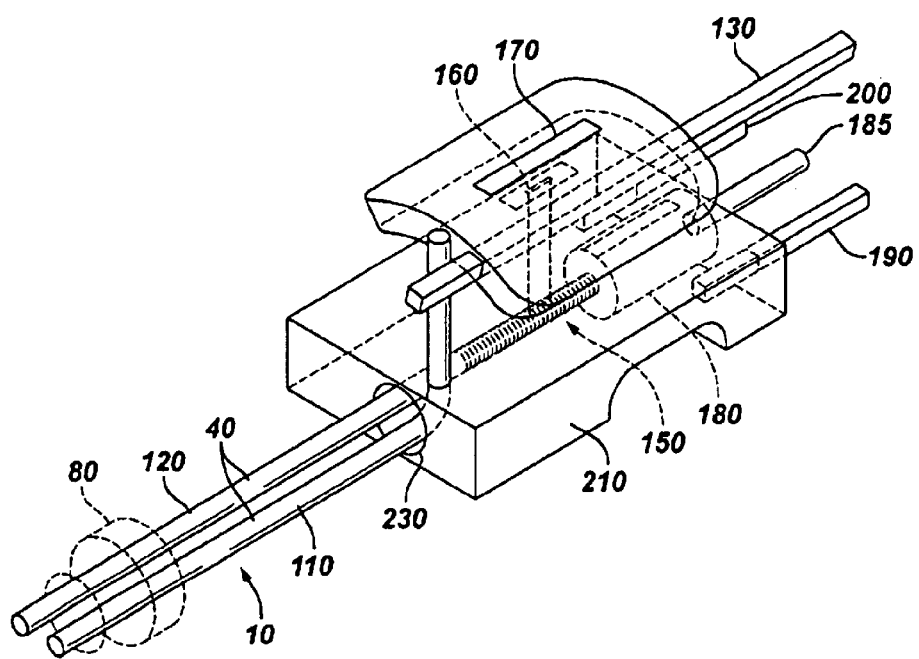
FIG. 2 is a schematic view of a linear magnetostrictive position sensor of the present invention wherein the pick up coil surrounds only one wave guide leg.

As shown in FIG. 2, the same type of structure is shown, however the termination is different at the sensor head 230. Leg 110 is attached such as by welding, to a return pin 130. The other leg 120 is connected to a pick up coil 150, anchored to an anchor 180 which is connected to or a contiguous part of anchor pin 185 of anchor 180. A tape 160 connected to a bias magnet 170 is connected such as by welding to leg 120. The coil 150 is connected to a finished pin 200 and a start pin 140. All this may be carried on a bobbin 210.

Alternatively for the head, one of the wave guide leads 40, such as leg 110 may be connected to a return pin 130. It should be noted at this point that in FIG. 1 the wave guide leads 40 may be connected in any manner known in the art, such as to a return pin, such as illustrated as return pin 130, or welded to a pin 130 or fit into a plug or otherwise be attached to a circuit card (not shown) for introducing the electrical or the current signal into the wave guide 10. As shown in FIG. 2, however, one of the wave guide leads, such as leg 110, is connected to the return pin 130 and does not go through the coil 150. This is because the pickup coil 70 in FIG. 1 is an end pickup coil, whereas in FIG. 2 the pickup coil 150 is a side pick-up coil. In FIG. 2 the leg 120 passes under pickup coil 150 to be anchored by anchor 180 for introducing the current pulse between return pin 130 and anchor pin 185 of anchor 180. Thus, the tape 160 and the bias magnet 170 are used with coil 150 through the coil leads 190, 200 which carry the detected signal in the same manner as the coil leads 90 from pickup coil 70.

By being able to use a smaller transducer package for magnetostrictive transducers, such transducers may be installed in applications that have previously not been possible due to the large physical size of the prior art.

Because many varying and different embodiments may be made within the scope of the invention concept taught herein which may involve many modifications in the embodiments herein detailed in accordance with the descriptive requirements of the law, it is to be understood that the details herein are to be interpreted as illustrative and not in a limiting sense.

What is claimed as invention is:

1. A magnetostrictive device, comprising:
    a waveguide, said waveguide being folded and forming two substantially parallel legs;
    a mode converter, said mode converter surrounding at least a portion of at least one of said legs of said waveguide; and
    said legs being electrically insulated from each other.

2. The device of claim 1, wherein said legs being electrically insulated from each other; said fold of said waveguide is located at the farthest distance from said mode converter; said waveguide supports a sonic pulse in response to a current pulse applied to said waveguide.

3. The device of claim 1 which uses a current pulse applied to said waveguide to generate a sonic pulse in response to the current pulse, the sonic pulse being supported by said waveguide, wherein said mode converter supplies an electrical output in response to the sonic pulse traveling down said waveguide reaching said mode converter.

4. The device of claim 1, wherein said electrical insulation prevents said legs from touching.

5. The device of claim 1, wherein said mode converter is located at a fixed position on said one of said legs.

6. The device of claim 1, wherein there is further included a position magnet slidingly mounted on said wave guide.

* * * * *